Figure 1:
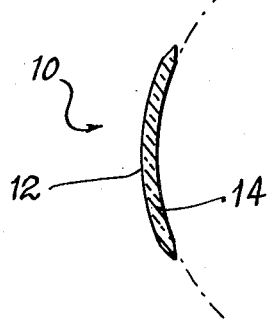

United States Patent [19]
Wesley

[11] 3,794,414
[45] Feb. 26, 1974

[54] MULTIPLE FOCAL CONTACT LENS
[75] Inventor: Newton K. Wesley, Chicago, Ill.
[73] Assignee: Wesley-Jessen Inc., Chicago, Ill.
[22] Filed: May 12, 1972
[21] Appl. No.: 252,758

Related U.S. Application Data
[63] Continuation of Ser. No. 536, Jan. 5, 1970, abandoned, which is a continuation-in-part of Ser. No. 632,398, April 20, 1967, abandoned.

[52] U.S. Cl. .................. 351/161, 351/160, 351/46
[51] Int. Cl. ............................................ G02c 7/04
[58] Field of Search ..................... 351/160, 161, 46

[56] References Cited
UNITED STATES PATENTS

| | | | |
|---|---|---|---|
| 3,507,566 | 4/1970 | Knapp | 351/160 |
| 564,518 | 7/1896 | Heilborn | 351/46 |
| 1,206,132 | 11/1916 | Otte | 351/46 X |
| 1,959,915 | 5/1934 | Guthrie | 351/46 |
| 2,129,305 | 9/1938 | Feinbloom | 351/162 |

FOREIGN PATENTS OR APPLICATIONS

| | | | |
|---|---|---|---|
| 167,273 | 12/1950 | Austria | 351/160 |
| 369,993 | 12/1906 | France | 351/46 |
| 1,026,839 | 4/1966 | Great Britain | 351/161 |

OTHER PUBLICATIONS

Sefcheck, Article in Contacto Vol. 11, No. 4, Dec. 1967, pgs. 56–59.
Mazow, Article in Contacto Vol. 2, No. 5, Sept. 1958, pgs. 128, 130 & 131.
Precision-Cosmet Digest Vol. 2 No. 8 March 1962 pgs. 1–6 Copy in 351/161.
Freeman, Article in American Journal of Optometry & Archives Vol. 29, No. 7, July 1952, pgs. 347–352.

*Primary Examiner*—David H. Rubin
*Attorney, Agent, or Firm*—Pennie & Edmonds

[57] ABSTRACT

A contact lens construction suitable for use by individuals ordinarily requiring a bifocal prescription. The lens includes a light transmitting area interrupted by spaced-apart opaque portions. Continuous focal characteristics are achieved by utilizing light transmitting portions for providing vision requirements and for achieving a sufficient peripheral field, adequate illumination, and normal centering. A distance vision correction is provided in a centrally located lens area.

2 Claims, 10 Drawing Figures

PATENTED FEB 26 1974 3,794,414

SHEET 1 OF 2

INVENTOR
Newton K. Wesley
by McDougall, Hersh & Scott
Att'ys

MULTIPLE FOCAL CONTACT LENS

This application is a continuation of application Ser. No. 536 filed Jan. 5, 1970, now abandoned, which is a continuation-in-part of application Ser. No. 632,398, filed Apr. 20, 1967, now abandoned.

This invention relates to contact lenses and is particularly directed to a contact lens having continuous focal characteristics.

Bifocal contact lenses have previously been produced. Such lenses generally follow the design of bifocal lenses employed in conventional eye glasses in that a more or less definite line of demarcation is provided in the bifocal lenses. The wearer of the lenses must look through one portion of the lens for achieving distance vision and through another portion of the lens for achieving close vision.

In the case of conventional eye glasses, the wearer can generally accommodate to bifocal lenses without undue difficulty. Usually, the wearer will look straight ahead through an upper portion of the lens for distance vision and will lower his eyes for looking through the lower portion of the lenses for close vision.

Bifocal contact lenses have been designed for use in substantially the same manner. A much more difficult problem is encountered, however, with respect to training the wearer to adjust for distance and close vision. Since the lens rides directly on the eye, there is obviously a very limited area for eye movement whereby one portion of the lens can be employed in preference to another portion. Furthermore, any shifting of the lens position on the eye will require a corresponding adjustment of the wearer further complicating the use of the lenses.

Pinhole contact lenses have been proposed, for example, as discussed in an article entitled "Bifocal Contact Lenses" published in the Precision-Cosmet Digest, March, 1962, pp. 1–6. The conclusions reached, however, are that this type of lens adversely affects peripheral vision, vision when the lens is decentered, and illumination and, therefore, has very limited potential.

It is a general object of the instant invention to provide a contact lens construction which will provide continuous focal characteristics while eliminating many of the difficulties encountered in the use of previously designed bifocal contact lenses.

It is a further object of the instant invention to provide a continuous focal lens of the type described which can be manufactured and fitted without undue difficulty thereby enabling prescription of the lenses at a relatively low cost.

It is a still further object of this invention to provide a continuous focal lens utilizing in part a pinhole principle along with important additional features which eliminate difficulties previously experienced and which thus provide a practical continuous focal lens.

It is a still further object of this invention to provide a contact lens of the type described which can be readily manufactured as cosmetic lens.

These and other objects of this invention will appear hereinafter and for purposes of illustration, but not of limitation, specific embodiments of the invention are shown in the accompanying drawings in which:

FIG. 1 is a cross-sectional view of a lens of the type produced in accordance with the features of the instant invention; and, FIGS. 2 through 10 illustrate a variety of designs for pupil areas of lenses adapted to be employed in accordance with the concepts of this invention.

The lens of the instant invention may comprise a conventional construction, for example of the type disclosed in Touhy U.S. Pat. No. 2,510,438. Such lenses comprise so-called corneal lens constructions and have, generally speaking, a pupil area and a surrounding iris area. It will be understood that the invention is also applicable to contact lens designs other than the corneal type.

Pupil and iris areas are not precisely defined due to the fact that the pupil size changes with light conditions and because of different eye characteristics among patients. Accordingly, where reference is made to an "iris area" and a "pupil area" of the lens in the specification and claims, this should be understood to mean the usual areas of the lens which are superimposed over the pupil and surrounding iris under normal lighting conditions, and these are well known to experienced practitioners.

The specific contact lens of this invention defines a concave-convex shape with the concave surface being adapted to adhere to and float on the cornea. The concave surface has a curvature which substantially conforms to the cornea; however, in this connection, precise conforming of the respective curvatures is not achieved. This is partly due to practical limitations in manufacturing; however, deliberate variations are also provided for specific reasons. Thus, a definite deviation is provided near the center of the lens and cornea to insure the presence of a tear layer. Other deviations, particularly around the periphery are provided, for example, as discussed in the aforementioned Touhy patent.

In accordance with the principles of this invention, the pupil area of the lens comprises a centrally located, light transmitting opening. This opening is surrounded by an opaque region which occupies a portion of the pupil area and which may extend into the surrounding iris area. This opaque region is interrupted by light transmitting openings located in the pupil area. Thus, light is passed through the lens in the centrally located area as well as through the light transmitting openings which interrupt the opaque region. A limitation is placed on the extent of the opaque region so that light is also passed through the lens beyond the outer limit of the opauqe regions.

The centrally located light transmitting opening is provided with an optical correction in accordance with the distance vision requirements of the wearer. The lens which results from this combination has been found to provide the necessary distance vision requirements since the wearer automatically will employ the centrally located light transmitting opening when viewing objects at a distance. Surprisingly, the combination described also provides for close vision even where no specific correction is made outside the area of the centrally located pupil opening. Thus, the distance correction may extend across the lens or no correction at all may be employed beyond the centrally located opening. Nevertheless, the light transmitting interruptions in the opaque region, in combination with the central opening, have been found to provide for close vision, adequate peripheral field, and satisfactory illumination, while the outer areas of the lens beyond the limits of the opaque region cooperate with the light transmitting interruptions to prevent loss of vision upon decentering of the lens.

The lens of this invention differs from a typical bifocal lens since a bifocal employs two basically different optical corrections to accommodate distance and close vision. As pointed out, the lens of this invention provides a continuous focal arrangement since the user is aware of no demarcation for near and distance vision. The lens makes no provision for any correction other than the distance correction with the central opening and other light transmitting interruptions in the opauqe regions providing for close vision. The invention also eliminates problems associated with "pin hole" bifocal lenses. Thus, peripheral vision is not impaired, completely adequate illumination is provided, and fitting methods requiring normal centering can be used since vision is still accomplished if the lens is decentered.

The lens construction 10 illustrated in FIG. 1 comprises an area 12 which consists of the pupil area under normal conditions and a surrounding iris area 14. In accordance with the concepts of this invention, the pupil area is provided with opaque areas and interrupting openings which provide for transmission of light.

Figure 2:
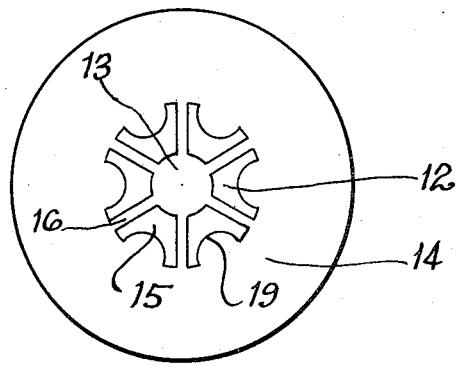

FIG. 2 illustrates one practical embodiment of the invention. The lens illustrated consists of a centrally located light transmitting opening 13 in the pupil area 12. This opening is surrounded by opaque regions 15 which are interrupted at 16 to provide light transmitting slits. The regions 15 define semi-circular cut-out areas 19 which, if the lens is not centered, may act as secondary pinhole openings.

In a typical case, the lens shown in FIG. 2 may have an outer diameter of 9 mm with the outer diameter of the opaque region 15 being 4.5 mm. The central opening 13 will have a diameter of 1.5 mm and the slits 16 have a length of 1.5 mm and a width of 0.4 mm.

The dimensions of contact lenses vary in accordance with the needs of a particular patient. It has been found, however, that for the average patient the centrally located opening in the pupil area, if circular, should not have a diameter in excess of 2 mm and preferably not less than 1 mm whereby the area of the light transmitting opening will be between about 0.8 mm$^2$ and 3.14 mm$^2$. For the case of a patient requiring a high add, the diameter may go as low as 0.5 mm. The opaque area surrounding the light transmitting central opening should have a width of at least 0.5 mm in all directions with the exception of those portions interrupted by the additional light transmitting openings. This opaque area should extend for 1.0 mm but not beyond about 3.00 mm when measured from the center of the pupil area 12, to provide adequate illumination, and to permit distance vision if the lens decenters. With this limitation, the opaque region will be about the same as the pupil diameter of the average person under normal lighting conditions (about 10 foot candles). The openings 16 should have a minimum dimension in any direction between about 0.2 mm and 0.7 mm.

In the use of the lenses illustrated, the wearer places a lens in each eye in conventional fashion. Proper correction for a nearsighted condition can be provided at least in the region 13 of the lens without difficulty. Surprisingly, the provision of the central opening 13 along with the openings 16 interrupting the opaque areas 15 provides for close vision, the peripheral field and illumination. This can be accomplished without a prescribed optical correction in the area of the lens outside the central opening 13, however, a prescription for distance, for practical reasons, is usually ground across the entire lens.

Lenses of the type contemplated may include opaque portions of various colors to provide a desired cosmetic effect. Where reference is made to "opaque" portions, it will be understood that semi-opaque characteristics of at least 50 percent reduction in light transmission are contemplated since the primary purpose is to eliminate a significant light transmission except through the openings 16.

Coloring of the pupil and also the iris areas can be accomplished in accordance with conventional techniques wherein pigments are included in the lens during manufacture, or wherein opaque materials are painted on the lens. The most natural cosmetic effect can be accomplished by using opaque regions 15 which are black (however, any color which cuts out at least 50 percent of the light, may be employed) and by limiting the dimensions of these opaque regions to the apparent size of the pupil under natural light conditions. A blue, green, brown or other color, preferably of greater light transmitting characteristics, could then be incorporated in the surrounding iris area; however, this area is usually left clear to provide adequate illumination.

In the actual prescription of continuous focal lenses, the particular visual characteristics of the individual being fitted are naturally considered. Such characteristics vary extensively, and a lens design suitable for one individual may not be too suitable for another. Accordingly, a variety of different designs for lenses embodying the concepts of this invention are contemplated. It has been found, however, that with the exception illustrated in FIG. 10, suitable lenses are not interrupted by opaque areas between the central opening and additional openings. Thus, the advantages of the invention are not achieved where the slits 16 are extended from the outer edge of the opaque region but stop a significant distance short of the central opening 13.

Figure 3:
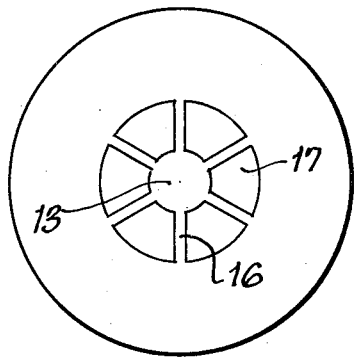

The cut-outs 19 provide a desirable arrangement for increasing light transmission and act as a secondary pupil if not centered which increases the tolerance as far as positioning of the lens is concerned. There are still sufficient opaque areas to maintain the benefit of the combination of opaque regions and slits, however, the cut-outs are not a requirement in all cases. FIG. 3 illustrates a modified form of the invention wherein the opaque regions 17 are in the form of individual pie-shaped segments without the semi-circular cut-outs 19 formed in each segment.

Figure 4:
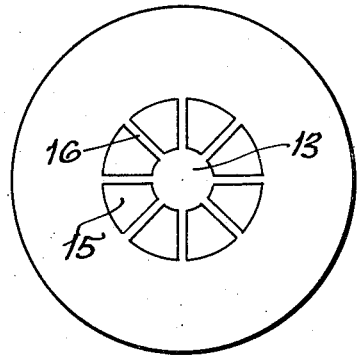
Figure 5:
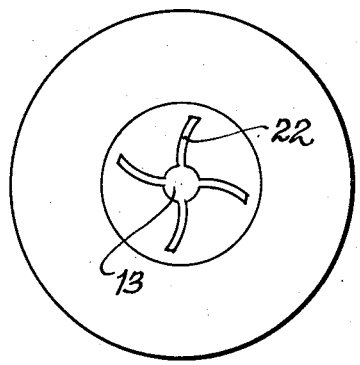
Figure 6:
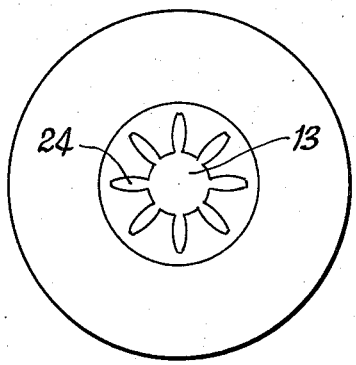
Figure 7:
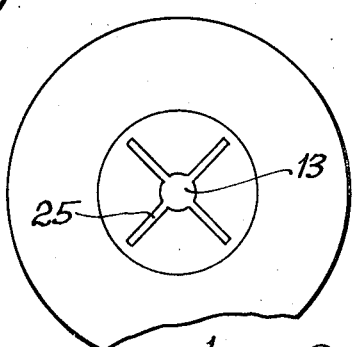
Figure 8:
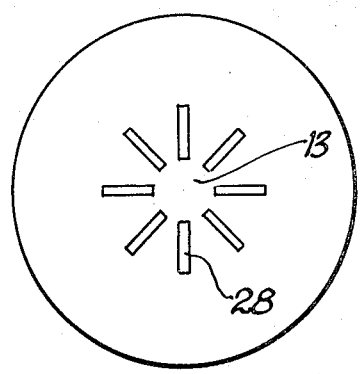
Figure 9:
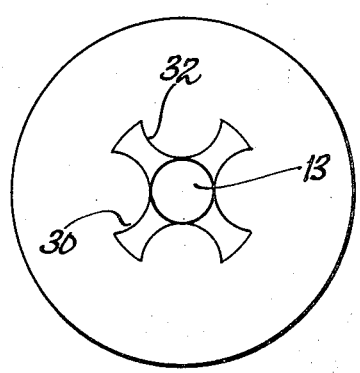

FIGS. 4 through 10 illustrate a variety of other lens designs which are characterized by the features of this invention. In FIG. 4, eight segments 15 are employed instead of six. FIGS. 5, 6 and 7 illustrate arrangements involving the use of slits in different patterns. Cross arrangements are provided by the slits 22 of FIG. 5, the slits 24 illustrated in FIG. 6, and slits 25 of FIG. 7. The design shown in FIG. 8 includes rectangular opaque areas 28, and it will be appreciated that other configurations for these opaque areas will be equally suitable. In FIG. 9, the opaque areas 30 are formed by means of semi-circular cut-outs 32 which are formed closely tangent to the central opening 13. The semicircular configuration provides a desirable means for supplementing the pinhole opening 13 when the lenses is decentered.

It will be apparent that other designs for the narrow slits or other light transmitting openings could be utilized, and one experienced in fitting such lenses could determine the most likely configuration by studying the eye characteristics. It is anticipated, however, that the best designs will be determined through the use of means permitting testing of a patient with the respective configurations.

Figure 10:
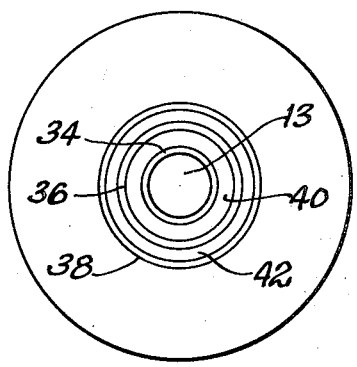

In FIG. 10, the opaque areas are provided by means of concentric rings 34, 36 and 38 which are interrupted by annular light transmitting openings 40 and 42. Although with this design, the openings 40 and 42 do not intersect the central opening 13, it has been found that the advantages of the invention can still be achieved. Thus, the light transmitting openings operate as one lens system and converge the light at one point. Decentering does not eliminate vision, and adequate illumination is provided.

The various lens designs all eliminate problems characteristic of pinhole contact lenses. Where a single pinhole is employed, an intolerable situation is encountered from the standpoint of peripheral field capabilities and illumination. In addition, the wearer is effectively blind when the lens is decentered due to blinking or for any other reason. Where attempts have been made to solve this by providing multiple pinholes, diplopia (double vision) will occur with two pinholes and polyopia (multiple vision) will occur with multiple pinholes.

The simplicity of the arrangements described when compared with conventional bifocal lenses will be apparent. Techniques employed in the preparation of cosmetic lenses can be readily adapted for the preparation of the continuous focal lenses of this invention. The lenses do not require any special training for the wearer since the wearer need not "hunt" for bifocal segments when shifting to a different view. The natural reading position of the head can be used.

The lenses can be designed whereby the particular visual condition of a particular wearer can be accommodated. It is also important to note that the lenses will have a natural appearance since the lenses can be colored without difficulty. In this respect, different eye colors can be prescribed where this is desired for cosmetic reasons.

An additional major advantage of the lenses relates to the ease of fitting. In many cases, conventional lenses, particularly bifocals, are extremely difficult to fit since shifting on the eye is necessary for proper vision. It has been found that fitting is not nearly as critical with continuous focal lenses of the type contemplated by this invention since only normal centering is necessary.

It will be understood that various changes and modifications may be made in the above described lenses which provide the characteristics of this invention.

That which is claimed is:

1. In a contact lens structure having a concaveconvex shape with the concave surface being adapted to adhere to and float on the cornea and having a curvature substantially conforming to the cornea, at least that portion of the lens designed to be located over the pupil of the wearer when the lens is positioned on the eye being prescription ground to provide a distance vision correction for the wearer, an opaque region located in the central portion of the lens and defining an essentially circular pattern, the diameter of the opaque region being at least sufficient to provide for covering of at least said portion of the lens designed to be located over the pupil of the wearer, and a substantially unrestricted light transmitting opening defined in the center of said opaque region, the improvement comprising a plurality of light transmitting openings communicating with said central opening and extending outwardly from said central opening, said light transmitting openings being in the form of narrow slits extending radially from the central opening to thereby provide a plurality of wedge-shaped opaque portions, the respective junctures of the slits with said central opening being substantially equally spaced apart whereby said wedge-shaped portions are of substantially the same shape, and wherein the width of said slits is substantially smaller than the diameter of said central opening.

2. A construction in accordance with claim 1 wherein said slits have a width of at least 0.05 mm.

* * * * *